US012654430B2

(12) United States Patent
Ishiuchi et al.

(10) Patent No.: US 12,654,430 B2

(45) Date of Patent: Jun. 16, 2026

(54) MULTILAYER STRUCTURE, AND SEPARATION METHOD AND RECYCLING METHOD THEREFOR

(71) Applicant: Kuraray Co., Ltd., Okayama (JP)

(72) Inventors: Satoshi Ishiuchi, Kurashiki (JP); Makoto Suzuki, Kurashiki (JP)

(73) Assignee: Kuraray Co., Ltd., Okayama (JP)

( * ) Notice: Subject to any disclaimer, the term of this patent is extended or adjusted under 35 U.S.C. 154(b) by 69 days.

(21) Appl. No.: 18/038,960

(22) PCT Filed: Nov. 24, 2021

(86) PCT No.: PCT/JP2021/043077

§ 371 (c)(1),
(2) Date: May 25, 2023

(87) PCT Pub. No.: WO2022/114032

PCT Pub. Date: Jun. 2, 2022

(65) Prior Publication Data

US 2024/0116281 A1 Apr. 11, 2024

(30) Foreign Application Priority Data

Nov. 26, 2020 (JP) ................................. 2020-196221

(51) Int. Cl.

| | |
|---|---|
| ***B32B 27/20*** | (2006.01) |
| ***B29B 17/02*** | (2006.01) |
| ***B32B 7/02*** | (2019.01) |
| ***B32B 7/12*** | (2006.01) |
| ***B32B 27/08*** | (2006.01) |
| ***B32B 27/22*** | (2006.01) |
| ***B32B 27/30*** | (2006.01) |
| ***B32B 27/34*** | (2006.01) |

(52) U.S. Cl.

CPC .............. *B32B 27/20* (2013.01); *B29B 17/02* (2013.01); *B32B 7/02* (2013.01); *B32B 7/12* (2013.01); *B32B 27/08* (2013.01); *B32B 27/22* (2013.01); *B32B 27/306* (2013.01); *B32B 27/34* (2013.01); *B29B 2017/0244* (2013.01); *B29B 2017/0293* (2013.01); *B32B 2250/02* (2013.01); *B32B 2250/24* (2013.01); *B32B 2264/1053* (2020.08); *B32B 2307/7166* (2013.01); *B32B 2307/72* (2013.01); *B32B 2307/7242* (2013.01)

(58) Field of Classification Search

None

See application file for complete search history.

(56) References Cited

U.S. PATENT DOCUMENTS

| | | | | |
|---|---|---|---|---|
| 2005/0058789 | A1 | 3/2005 | Nonaka et al. | |
| 2013/0017383 | A1 | 1/2013 | Tai et al. | |
| 2017/0298308 | A1* | 10/2017 | Labeque ................ | B65D 43/22 |
| 2020/0140647 | A1 | 5/2020 | Van Berkum et al. | |
| 2022/0297413 | A1 | 9/2022 | Nakai et al. | |

FOREIGN PATENT DOCUMENTS

| | | | | |
|---|---|---|---|---|
| CN | 103097129 | A | | 5/2013 |
| JP | H11-348201 | A | | 12/1999 |
| JP | 2002121349 | A | * | 4/2002 |
| JP | 2005-088344 | A | | 4/2005 |
| JP | 2018-534184 | A | | 11/2018 |
| JP | 2021-146507 | A | | 9/2021 |
| WO | 2013/086950 | A1 | | 6/2013 |
| WO | 2017/047806 | A1 | | 3/2017 |
| WO | 2021/132683 | A1 | | 7/2021 |

OTHER PUBLICATIONS

Machine translation of JPWO 2017-047806 A1 (Year: 2017).*
Machine translation of JP 2002-121349 A (Year: 2002).*
International Search Report issued in corresponding International Patent Application No. PCT/JP2021/043077 dated Feb. 1, 2022.
Written Opinion issued in corresponding International Patent Application No. PCT/JP2021/043077 dated Feb. 1, 2022.

* cited by examiner

*Primary Examiner* — Ramsey Zacharia

(74) *Attorney, Agent, or Firm* — Morgan, Lewis & Bockius LLP

(57) ABSTRACT

Provided are a multilayer structure and the like being superior in adhesiveness of an interlayer under high humidity and separability of a barrier layer in water, and even in a case in which the barrier layer is exposed to water in a separating and collecting step, being superior in viscosity stability after separating and collecting a resin that constitutes the barrier layer. The multilayer structure of the present invention is a multilayer structure including a barrier layer (A), a water-soluble layer (B), and an adhesive layer (C), in which: the adhesive layer (C) is laminated via the water-soluble layer (B) on one or both faces of the barrier layer (A); the barrier layer (A) contains a polyamide or an ethylene-vinyl alcohol copolymer (a1) as a principal component; and the water-soluble layer (B) contains an alkali metal ion (b1) at a content of 100 ppm or more and 2,000 ppm or less.

18 Claims, No Drawings

MULTILAYER STRUCTURE, AND SEPARATION METHOD AND RECYCLING METHOD THEREFOR

TECHNICAL FIELD

The present invention relates to a multilayer structure, and a separation method and a recycling method therefor.

BACKGROUND ART

Conventionally, as a packaging material which is transparent and has superior oxygen barrier properties, a gas barrier resin film constituted from an ethylene-vinyl alcohol copolymer (hereinafter, may be referred to as "EVOH") or the like has been used. Moreover, EVOH has been used also for intended usages such as laminated packaging materials, etc., utilizing advantages in thermoformability in addition to superior gas barrier properties. As the laminated packaging material, there is known, for example, a multilayer structure which includes a layer constituted from a resin composition containing EVOH, a component consisting of at least one of nitric acid and nitrate ion, a metal ion, and a carboxylic acid or a carboxylate ion, each in a specific amount (Patent Document 1).

Furthermore, in an attempt to improve strength and/or secondary processability of a laminated film, a laminated packaging material constituted from a polyamide or the like may be used as a gas barrier layer. As the laminated packaging material, for example, a multilayer film in which a polyamide layer and a polyolefin layer are laminated is known (Patent Document 2).

PRIOR ART DOCUMENTS

Patent Documents

Patent Document 1: PCT International Publication No. 2017/047806

Patent Document 2: Japanese Unexamined Patent Application, Publication No. 2005-088344

SUMMARY OF THE INVENTION

Problems to be Solved by the Invention

The multilayer structures disclosed in Patent Documents 1 and 2 involve a problem of impaired recyclability when the multilayer structures are recovered and reused, resulting from generation of aggregates through crosslinking or degradation of the EVOH or polyamide due to being repeatedly heated.

The present invention was made for solving the aforementioned problems, and an object of the invention is to provide: a multilayer structure that is superior in adhesiveness of the interlayer under high humidity and separability of the barrier layer in water, and is also superior in viscosity stability, even in a case in which the barrier layer is exposed to water in a separating and collecting step, after separation and collection of the resin constituting the barrier layer; and a separation method and a recycling method for the same.

Means for Solving the Problems

The foregoing problems can be solved by providing any of the followings:

(1) A multilayer structure including a barrier layer (A), a water-soluble layer (B), and an adhesive layer (C), in which: the adhesive layer (C) is laminated via the water-soluble layer (B) on one or both faces of the barrier layer (A); the barrier layer (A) contains a polyamide or an ethylene-vinyl alcohol copolymer (a1) as a principal component; and the water-soluble layer (B) contains an alkali metal ion (b1) at a content of 10 ppm or more and 2,000 ppm or less;

(2) The multilayer structure according to (1), wherein the water-soluble layer (B) contains a vinyl alcohol polymer (b2) as a principal component;

(3) The multilayer structure according to (2), wherein a viscosity-average degree of polymerization of the vinyl alcohol polymer (b2) is 400 or more and 2,000 or less;

(4) The multilayer structure according to (2) or (3), wherein a degree of saponification of the vinyl alcohol polymer (b2) is 70 mol % or more and 95 mol % or less;

(5) The multilayer structure according to any one of (2) to (4), wherein a total content of a vinyl alcohol unit and a vinyl ester unit in the vinyl alcohol polymer (b2) is 95 mol % or more;

(6) The multilayer structure according to any one of (1) to (5), wherein the alkali metal ion (b1) contained in the water-soluble layer (B) is a sodium ion;

(7) The multilayer structure according to any one of (1) to (6), wherein the water-soluble layer (B) further contains a plasticizer (b3), and a component constituting the plasticizer (b3) is at least one selected from the group consisting of glycerin, polyethylene glycol, polypropylene glycol, polyglycerin, mannitol, sorbitol, and pentaerythritol;

(8) The multilayer structure according to any one of (1) to (7), wherein a solubility parameter of a resin constituting the principal component of the barrier layer (A) is 11.0 $(cal/cm^3)^{1/2}$ or more, and a ratio ($SP_A/SP_B$) of a solubility parameter ($SP_A$) of the barrier layer (A) to a solubility parameter ($SP_B$) of a resin constituting the principal component of the water-soluble layer (B) is 0.60 or more and 0.95 or less;

(9) The multilayer structure according to any one of (1) to (8), wherein the barrier layer (A) contains the ethylene-vinyl alcohol copolymer as the principal component;

(10) The multilayer structure according to any one of (1) to (9), wherein the barrier layer (A) further contains an alkali metal ion (a2) at a content of 50 ppm or more and 500 ppm or less;

(11) The multilayer structure according to any one of (1) to (10), wherein the barrier layer (A) further contains a higher aliphatic acid or a salt thereof at a content of 1 ppm or more and 5,000 ppm or less;

(12) The multilayer structure according to any one of (1) to (11), wherein the barrier layer (A) further contains a boron compound at a content of 1 ppm or more and 300 ppm or less in terms of boron element;

(13) The multilayer structure according to any one of (1) to (12), wherein the adhesive layer (C) contains a carboxylic acid-modified polyolefin as a principal component;

(14) The multilayer structure according to any one of (1) to (13), further containing an other thermoplastic resin layer (D), wherein a density of the other thermoplastic resin layer (D) is 1.0 $g/cm^3$ or less;

(15) The multilayer structure according to any one of (1) to (14), wherein a density of the barrier layer (A) is 1.0 $g/cm^3$ or more, and a density of an entirety of layers, other than the barrier layer (A) and the water-soluble layer (B), is 1.0 g/cm$^3$ or less;

(16) A separation method including: bringing the multilayer structure according to any one of (1) to (15) into contact with water (W) having a temperature of 20° C. to 95° C. to dissolve a part or all of the water-soluble layer (B); and sedimenting a substance (X) including the barrier layer (A) and floating a substance (Y) including the adhesive layer (C) in the water (W); and

(17) A method for recycling a multilayer structure, the method including: independently melt molding each of the substance (X) and the substance (Y), being collected in the separation method according to (16).

Effects of the Invention

The multilayer structure of the present invention is superior in adhesiveness of an interlayer under high humidity and separability of a barrier layer in water, and even in a case in which the barrier layer is exposed to water in a separating and collecting step, is superior in viscosity stability when reutilized after separation and collection of a resin that constitutes the barrier layer. Specifically, for example, a separation method in which an adhesive resin is floated, and an ethylene-vinyl alcohol copolymer or a polyamide is sedimented can be provided. In addition, a recycling method in which each substance separated in this manner is independently subjected to melt molding can be provided. Accordingly, recycling suitability as a packaging material can be improved while inhibiting deterioration of performance and/or quality as the packaging material, thereby enabling contribution to realization of a recycling-oriented society.

DESCRIPTION OF EMBODIMENTS

The multilayer structure of the present invention is a multilayer structure including a barrier layer (A), a water-soluble layer (B), and an adhesive layer (C), in which: the adhesive layer (C) is laminated via the water-soluble layer (B) on one or both faces of the barrier layer (A); the barrier layer (A) contains a polyamide or an ethylene-vinyl alcohol copolymer (a1) as a principal component; and the water-soluble layer (B) contains an alkali metal ion (b1) at a content of 10 ppm or more and 2,000 ppm or less.

It is to be noted that as referred to herein, a "principal component" means a component having the highest content on mass basis. Furthermore, "ppm" means a proportion on mass basis.

Barrier Layer (A)

A resin being a principal component constituting the barrier layer (A) is a polyamide or an EVOH. Due to the polyamide or the EVOH being contained as the principal component, oxygen barrier properties of the multilayer structure are improved. In light of recyclability after separation and collection, the resin being the principal component constituting the barrier layer (A) is more preferably the EVOH.

Examples of the polyamide include polycaproamide (nylon 6), poly-ω-aminoheptanoic acid (nylon 7), poly-ω-aminononanoic acid (nylon 9), polyundecanamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 106), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylene diammonium adipate/hexamethylenediammonium adipate copolymers (nylon 26/66), caprolactam/hexamethylenediammonium adipate/hexamethylenediammonium sebacate copolymers (nylon 6/66/610), ethylenediammonium adipate/hexamethylenediammonium adipate/hexamethylenediammonium sebacate copolymers (nylon 26/66/610), polyhexamethylene isophthalamide (nylon 6I), polyhexamethylene terephthalamide (nylon 6T), hexamethylene isophthalamide/hexamethylene terephthalamide copolymers (nylon 6I/6T), 11-aminoundecaneamide/hexamethylene terephthalamide copolymers, polynonamethylene terephthalamide (nylon 9T), polydecamethylene terephthalamide (nylon 10T), polyhexamethylene cyclohexylamide, and polynonamethylene cyclohexylamide, as well as these polyamides modified with an aromatic amine such as methylenebenzylamine or metaxylenediamine. In addition, metaxylylenediammonium adipate and the like may be also exemplified. Of these, in light of economic efficiency, melt formability, and mechanical properties each being superior, the polyamide is preferably nylon 6/66 or nylon 6.

The EVOH is a copolymer having an ethylene unit and a vinyl alcohol unit. The EVOH is a polymer typically obtained by saponifying an ethylene-vinyl ester copolymer. The lower limit of an ethylene unit content of the EVOH is preferably 20 mol %, and more preferably 25 mol %. When the ethylene unit content of the EVOH is more than or equal to the lower limit, flexibility and thermoformability of the EVOH may be improved, and thermoformability of the multilayer structure to be obtained may be improved. Furthermore, the upper limit of the ethylene unit content is preferably 55 mol %, and more preferably 50 mol %. When the ethylene unit content of the EVOH is less than or equal to the upper limit, gas barrier properties of the EVOH and multilayer structure to be obtained may be improved.

The degree of saponification of the EVOH is preferably 90 mol % or more, more preferably 95 mol % or more, and still more preferably 98 mol % or more. When the degree of saponification falls within the above range, thermal stability of a resin composition to be obtained may be improved.

The EVOH may have, within a range not leading to inhibition of the effects of the invention, a unit derived from an other monomer aside from ethylene, a vinyl ester, and a saponification product of a vinyl ester. In the case in which the EVOH has the unit derived from the other monomer, the content thereof with respect to total monomer units in the EVOH is preferably 10 mol % or less, more preferably 5 mol % or less, and still more preferably 3 mol % or less. Furthermore, the content of the other monomer unit may be 0.05 mol % or more. Examples of the other monomer include vinylsilane compounds such as vinyltrimethoxysilane, vinyltriethoxysilane, vinyltri(β-methoxy-ethoxy)silane, and γ-methacryloxypropylmethoxysilane, and the like.

The EVOH may have, within a range not leading to inhibition of the object of the present invention, at least any one of a structural unit (I) represented by the following formula (I), a structural unit (II) represented by the following formula (II), and a structural unit (III) represented by the following general formula (III). When the EVOH has such a structural unit, thermoformability of the multilayer structure to be obtained can be increased.

(I)

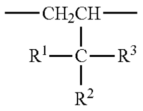

(II)

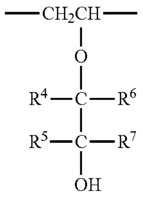

(III)

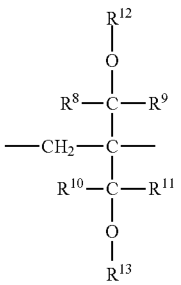

In the formula (I), $R^1$, $R^2$, and $R^3$ each independently represent a hydrogen atom, a hydroxyl group, an aliphatic hydrocarbon group having 1 to 10 carbon atoms, an alicyclic hydrocarbon group having 3 to 10 carbon atoms, or an aromatic hydrocarbon group having 6 to 10 carbon atoms. Furthermore, one pair among $R^1$, $R^2$, and $R^3$ may bond to each other. Moreover, a part or all of hydrogen atoms included in the aliphatic hydrocarbon group having 1 to 10 carbon atoms, the alicyclic hydrocarbon group having 3 to 10 carbon atoms, and the aromatic hydrocarbon group having 6 to 10 carbon atoms may be unsubstituted or substituted with a hydroxyl group, a carboxyl group, or a halogen atom.

In the formula (II), $R^4$, $R^5$, $R^6$, and $R^7$ each independently represent a hydrogen atom, a hydroxyl group, an aliphatic hydrocarbon group having 1 to 10 carbon atoms, an alicyclic hydrocarbon group having 3 to 10 carbon atoms, or an aromatic hydrocarbon group having 6 to 10 carbon atoms. Furthermore, $R^4$ may bond to $R^5$, or $R^6$ may bond to $R^7$. Moreover, a part or all of hydrogen atoms included in the aliphatic hydrocarbon group having 1 to 10 carbon atoms, the alicyclic hydrocarbon group having 3 to 10 carbon atoms, and the aromatic hydrocarbon group having 6 to 10 carbon atoms may be unsubstituted or substituted with a hydroxyl group, an alkoxy group, a carboxyl group, or a halogen atom.

In the formula (III), $R^8$, $R^9$, $R^{10}$, and $R^{11}$ each independently represent a hydrogen atom, a hydroxyl group, an aliphatic hydrocarbon group having 1 to 10 carbon atoms, an alicyclic hydrocarbon group having 3 to 10 carbon atoms, or an aromatic hydrocarbon group having 6 to 10 carbon atoms. Moreover, a part or all of hydrogen atoms included in the aliphatic hydrocarbon group having 1 to 10 carbon atoms, the alicyclic hydrocarbon group having 3 to 10 carbon atoms, and the aromatic hydrocarbon group having 6 to 10 carbon atoms may be unsubstituted or substituted with a hydroxyl group, an alkoxy group, a carboxyl group, or a halogen atom. $R^{12}$ and $R^{13}$ each independently represent a hydrogen atom, a formyl group, or an alkanoyl group having 2 to 10 carbon atoms.

In the case in which the EVOH includes the structural unit represented by the above formulae (I) to (III), the lower limit of a content thereof is preferably 0.1 mol %, more preferably 0.5 mol %, and still more preferably 1 mol %. Furthermore, the upper limit of the content is preferably 30 mol %, more preferably 15 mol %, and still more preferably 10 mol %. When the content of the structural unit represented by the above formulae falls within the above range, flexibility and processing characteristics of the resin composition may be improved, and thermoformability of the multilayer structure to be obtained may be improved.

In the structural unit represented by the above formulae, the aliphatic hydrocarbon group having 1 to 10 carbon atoms is exemplified by an alkyl group, an alkenyl group, and the like, the alicyclic hydrocarbon group having 3 to 10 carbon atoms is exemplified by a cycloalkyl group, a cycloalkenyl group, and the like, and the aromatic hydrocarbon group having 6 to 10 carbon atoms is exemplified by a phenyl group, and the like.

In the structural unit (I), $R^1$, $R^2$, and $R^3$ each independently represent preferably a hydrogen atom, a hydroxyethyl group, a methyl group, an ethyl group, a hydroxyl group, or a hydroxymethyl group, and of these, $R^1$, $R^2$, and $R^3$ each independently represent preferably a hydrogen atom, a hydroxyl group, a methyl group, or a hydroxymethyl group in light of further enhancement of the thermoformability in the multilayer structure to be obtained.

In the structural unit (II), it is preferred that $R^4$ and $R^5$ both represent a hydrogen atom. In particular, it is more preferred that $R^4$ and $R^5$ both represent a hydrogen atom, and one of $R^6$ and $R^7$ represents the aliphatic hydrocarbon group having 1 to 10 carbon atoms, while another one of $R^6$ and $R^7$ represents a hydrogen atom. This aliphatic hydrocarbon group is preferably an alkyl group or an alkenyl group. In light of importance particularly attached to gas barrier properties in the multilayer structure to be obtained, it is particularly preferred that one of $R^6$ and $R^7$ represents a methyl group or an ethyl group, and another one of $R^6$ and $R^7$ represents a hydrogen atom. Also, it is particularly preferred that one of $R^6$ and $R^7$ represents a substituent represented by $(CH_2)_hOH$ (wherein h is an integer of 1 to 8), and another one of $R^6$ and $R^7$ represents a hydrogen atom. In the substituent represented by $(CH_2)_hOH$, h is preferably an integer of 1 to 4, more preferably 1 or 2, and particularly preferably 1.

In the structural unit (III), $R^8$, $R^9$, $R^{10}$, and $R^{11}$ represent preferably a hydrogen atom or an aliphatic hydrocarbon group having 1 to 5 carbon atoms, and the aliphatic hydrocarbon group is preferably a methyl group, an ethyl group, an n-propyl group, an isopropyl group, an n-butyl group, an isobutyl group, a tert-butyl group, or an n-pentyl group.

The polyamide and the EVOH may be used alone of one type, or two or more types thereof may be used in combination.

The lower limit of a content of the polyamide or the EVOH in the barrier layer (A) is preferably 80% by mass, more preferably 90% by mass, and may be still more preferably 95% by mass, 97% by mass, or 99% by mass. When the content of the polyamide or the EVOH in the barrier layer (A) is more than or equal to the lower limit, the barrier properties can be improved. The upper limit of the content of the polyamide or the EVOH in the barrier layer (A) may be 100% by mass, or may be 99.99% by mass.

The barrier layer (A) preferably contains the alkali metal ion (a2) at a content of 50 ppm or more and 500 ppm or less. In particular, in the case in which the barrier layer (A) contains the EVOH as the principal component, the barrier layer (A) preferably contains the alkali metal ion (a2). When the content of the alkali metal ion (a2) is 50 ppm or more, viscosity stability of the resin constituting the barrier layer (A) after separation and collection of the multilayer structure may be improved. This advantage is considered to result from, in the separating and collecting step of the multilayer structure described later, enabling a sufficient amount of the alkali metal ion (a2) to remain, even in the case in which the alkali metal ion (a2) is eluted from the barrier layer (A) having been exposed to water. The content of the alkali metal ion (a2) is more preferably 80 ppm or more, and still more preferably 100 ppm or more. On the other hand, when the content of the alkali metal ion (a2) is 500 ppm or less, lowering of the viscosity in melt kneading for a long time period can be inhibited, whereby the melt formability can be improved. The content of the alkali metal ion (a2) is more preferably 300 ppm or less, and still more preferably 270 ppm or less.

The alkali metal ion (a2) is not particularly limited, and a sodium ion or a potassium ion is preferred.

The alkali metal ion (a2) contained in the barrier layer (A) may be present in a state of dissociation from an anion constituting the alkali metal salt, or may be present in a state of a salt bonding to the anion. Alternatively, the alkali metal ion (a2) may be present in a state of coordination with a group and/or the like (for example, a carboxy group, a hydroxyl group, etc.) included in the EVOH, the polyamide, and other optional component(s).

The alkali metal ion (a2) is typically derived from an alkali metal salt. In other words, the barrier layer (A) may contain the alkali metal salt. A component that includes the alkali metal ion (a2) is not particularly limited, and a fatty acid salt (acetate, propionate, etc.), a salt (nitrate, sulfate, etc.) other than fatty acid metal salts, and/or the like may be used.

It is preferred that the barrier layer (A) further contains a higher aliphatic acid or a salt thereof at a content of 1 ppm or more and 5,000 ppm or less in terms of higher aliphatic acid. In particular, in the case in which the barrier layer (A) contains the EVOH as the principal component, the barrier layer (A) preferably contains the higher aliphatic acid or a salt thereof. When the higher aliphatic acid or a salt thereof is contained, elution of the alkali metal ion (a2) from the barrier layer (A) in separation of the multilayer structure in water (W) can be inhibited, and as a result, the viscosity stability of the resin constituting the barrier layer (A) after separation and collection can be maintained. The content of the higher aliphatic acid or a salt thereof in terms of higher aliphatic acid is more preferably 5 ppm or more and 4,000 ppm or less, and still more preferably 10 ppm or more and 2,500 ppm or less.

A salt of the higher aliphatic acid (i.e., higher aliphatic acid salt) is exemplified by: an alkali metal salt, such as a sodium salt or a potassium salt, of the higher aliphatic acid; an alkaline earth metal salt, such as a magnesium salt or a calcium salt, of the higher aliphatic acid, and the like. It is to be noted that in the case in which the alkali metal salt of the higher aliphatic acid is contained, calculation of the content of the alkali metal ion (a2) in the barrier layer (A) is carried out in assumption that also the alkali metal ion in the alkali metal of the higher aliphatic acid is included.

The higher aliphatic acid or a salt thereof is preferably a higher aliphatic acid having 12 or more carbon atoms or a salt thereof, and is exemplified by fatty acids such as lauryl acid, lauric acid, tridecylic acid, myristic acid, pentadecylic acid, palmitic acid, heptadecylic acid, stearic acid, basic stearic acid, hydroxystearic acid, basic hydroxystearic acid, nonadecanoic acid, oleic acid, behenic acid, montanic acid, and linoleic acid, or a salt thereof. In light of dispersibility, etc., in the barrier layer (A), any one type, or two or more types of these may be used ad libitum.

It is preferred that the barrier layer (A) further contains a boron compound at a content of 1 ppm or more and 300 ppm or less in terms of boron element. In particular, in the case in which the barrier layer (A) contains the EVOH as the principal component, the barrier layer (A) preferably contains the boron compound. When the barrier layer (A) is formed from a resin composition containing the boron compound, torque fluctuation during heat melting can be inhibited. The boron compound which may be used in the present invention is not particularly limited, and is exemplified by boric acids, boric acid esters, boric acid salts, borohydrides, and the like. Specific examples of the boric acids include orthoboric acid, metaboric acid, tetraboric acid, and the like. Examples of the boric acid ester include triethyl borate, trimethyl borate, and the like, and examples of the boric acid salts include alkali metal salts, alkaline earth metal salts, borax, and the like of various types of boric acids. Of these compounds, orthoboric acid (hereinafter, may be merely referred to as "boric acid") is preferred. When the content of the boron compound is 1 ppm or more, the torque fluctuation during heat melting can be sufficiently inhibited. The lower limit of the content of the boron compound is more preferably 10 ppm. On the other hand, when the content of the boron compound in terms of boron element is 300 ppm or less, elution of the boric acid compound from the barrier layer (A) can be inhibited in separation of the multilayer structure, and as a result, viscosity stability of the resin constituting the barrier layer (A) after separation and collection may be improved. The upper limit of the content of the boron compound is more preferably 250 ppm, and still more preferably 200 ppm.

The barrier layer (A) may contain, within a range not leading to inhibition of the effects of the present invention, other component(s) aside from the alkali metal ion (a2), the higher aliphatic acid, the higher aliphatic acid salt, and the boron compound. Examples of the other component(s) include resins other than the polyamide and the EVOH, multivalent metal ions, carboxylic acids, phosphoric acid compounds, oxidization accelerators, antioxidants, plasticizers, heat stabilizers (melt stabilizers), photoinitiators, deodorizers, ultraviolet ray-absorbing agents, antistatic agents, lubricants, colorants, fillers, drying agents, bulking agents, pigments, dyes, processing aids, fire retardants, surfactants, crosslinking agents, fiber-reinforcing agents, anti-fogging agents, and the like. In light of enabling coloring to be inhibited during melt molding of the resin constituting the barrier layer (A), particularly the EVOH and the resin composition containing an EVOH, it is preferred that the carboxylic acid or the phosphoric acid compound is contained. The content of the other component in the barrier layer (A) is typically 5% by mass or less, preferably 3% by mass or less, and more preferably 1% by mass or less.

The resin other than the polyamide and the EVOH which may be contained in the barrier layer (A) is not particularly limited, and is exemplified by thermoplastic resins such as: a polyolefin; a polyester; a polystyrene; a polyvinyl chloride; an acrylic resin; a polyurethane; a polycarbonate; a polyvinyl acetate.

A procedure for allowing the barrier layer (A) to contain the alkali metal ion (a2), the higher aliphatic acid, the higher aliphatic acid salt, and the boron compound, as well as other additive(s) which may be added as needed, is not particularly limited, and is exemplified by: a procedure of melting the polyamide or the EVOH and mixing the compounds therewith; a procedure of melt blending the compounds with the polyamide or the EVOH in an extruder; a procedure of mixing a solid, a liquid, or a solution of the compound with pellets of the polyamide or the EVOH having a powdery, granular, spherical, or circular cylindrical chip shape, thereby allowing impregnation with or spreading of the compounds in/on the pellets of the polyamide or the EVOH; and the like, which may be appropriately selected taking into consideration physical properties of the compounds and/or permeability into the polyamide or the EVOH. Also, these procedures may be employed in combination. A temperature range in melt kneading may be appropriately controlled depending on a melting point and the like of the polyamide or EVOH to be used, and typically, a temperature of 150 to 250° C. may be adopted. It is to be noted that commercially available pelletized EVOH resin containing the alkali metal ion (a2), or the like may be used.

An average thickness per layer of the barrier layer (A) is not particularly limited, and the lower limit thereof is preferably 0.5 μm, more preferably 1 μm, and still more preferably 3 μm. When the average thickness of the barrier layer (A) is more than or equal to the lower limit, the barrier properties and the like can be improved. On the other hand, the upper limit of the average thickness is preferably 100 μm, more preferably 60 μm, still more preferably 40 μm, and yet more preferably 20 μm. When the average thickness of the barrier layer (A) is less than or equal to the upper limit, flexibility and the like can be improved. It is to be noted that the average thickness of the layer as referred to means an averaged value of thicknesses measured at arbitrary five sites. The same applies to other layers.

Water-Soluble Layer (B)

The water-soluble layer (B) contains the alkali metal ion (b1) at a content of 10 ppm or more and 2,000 ppm or less. When the content of the alkali metal ion (b1) falls within the above range, a part of the alkali metal ion (b1) in the water-soluble layer (B) transfers to the barrier layer (A) during separation of the multilayer structure, and thus even in a case in which the barrier layer is exposed to water in a separating and collecting step, viscosity stability after separation and collection of the resin that constitutes the barrier layer may be superior. When the content of the alkali metal ion (b1) is less than 10 ppm, in separation of the multilayer structure, transfer of the alkali metal ion (b1) in the water-soluble layer (B) to the barrier layer (A) does not sufficiently proceed, and as a result, the viscosity stability of the resin constituting the barrier layer (A) after separation and collection may be lowered. The lower limit of the content of the alkali metal ion (b1) is preferably 100 ppm, more preferably 200 ppm, and particularly preferably 500 ppm. On the other hand, when the content of the alkali metal ion (b1) is more than 2,000 ppm, lowering of the viscosity in melt kneading for a long time period may be intense, whereby the melt formability may be deteriorated. The upper limit of the content of the alkali metal ion (b1) is preferably 1,500 ppm, more preferably 1,200 ppm, and particularly preferably 1,000 ppm.

Examples of the alkali metal ion (b1) contained in the water-soluble layer (B) include a lithium ion, a sodium ion, and a potassium ion. In light of hue and viscosity stability of the resin composition, a sodium ion is preferred.

The alkali metal ion (b1) contained in the water-soluble layer (B) of the present invention may be present in a state of dissociation from the anion constituting the alkali metal salt, or may be present in a state of the salt bonding to the anion. Alternatively, the alkali metal ion (b1) may be present in a state of coordination with a group and/or the like (for example, a carboxy group, a hydroxyl group, etc.) included in the vinyl alcohol polymer (b2) described later and/or other optional component(s).

The alkali metal ion (b1) is typically derived from an alkali metal salt. In other words, the water-soluble layer (B) may contain the alkali metal salt. A component that includes the alkali metal ion (b1) is not particularly limited, and a fatty acid metal salt, a metal salt (nitrate, sulfate, etc.) other than fatty acid metal salts, and/or the like may be used.

The fatty acid metal salt may be either a higher aliphatic acid metal salt having 12 or more carbon atoms, or a fatty acid metal salt having 11 or fewer carbon atoms, and in light of ease in transfer from the water-soluble layer (B) to the barrier layer (A), an aliphatic metal salt having 11 or fewer carbon atoms is preferred. Examples of the higher aliphatic acid metal salt having 12 or more carbon atoms include metal salts of a fatty acid such as lauryl acid, lauric acid, tridecylic acid, myristic acid, pentadecylic acid, palmitic acid, heptadecylic acid, stearic acid, basic stearic acid, hydroxystearic acid, basic hydroxystearic acid, nonadecanoic acid, oleic acid, behenic acid, montanic acid, or linoleic acid. Examples of the fatty acid metal salt having 11 or fewer carbon atoms include acetate and propionate. In light of dispersibility, etc., in the water-soluble layer (B), any one type, or two or more types of these may be used ad libitum.

The resin being a principal component constituting the water-soluble layer (B) is exemplified by water-soluble resins, for example: starch components such as corn starch and polymer components thereof; cellulose polymers such as carboxymethylcellulose and carboxyethylcellulose; acrylic acid polymers such as sodium polyacrylate; and vinyl alcohol polymers such as polyvinyl alcohol. Of these, in light of melt formability and adhesiveness to the barrier layer (A), the vinyl alcohol polymer (b2) is preferred. When the water-soluble layer (B) contains the vinyl alcohol polymer as a principal component, gas barrier properties and separability of the multilayer structure may be improved. The vinyl alcohol polymer (b2) is a polymer having a vinyl alcohol unit. It is to be noted that in light of water solubility and the like, the vinyl alcohol polymer (b2) is preferably a vinyl alcohol polymer other than the EVOH (A) which can be used as the barrier layer (A).

The viscosity-average degree of polymerization of the vinyl alcohol polymer (b2) is preferably 400 or more and 2,000 or less. The lower limit of the viscosity-average degree of polymerization is more preferably 500, and still more preferably 700. When the viscosity-average degree of polymerization is more than or equal to the lower limit, adhesiveness and/or thermal stability of the vinyl alcohol polymer (b2) may be improved. The upper limit of the viscosity-average degree of polymerization is more preferably 1,500, and still more preferably 1,000. When the viscosity-average degree of polymerization is less than or equal to the upper limit, melt formability of the vinyl alcohol polymer (b2) may be improved.

The viscosity-average degree of polymerization of the vinyl alcohol polymer (b2) is determined in accordance with JIS K 6726: 1994. Specifically, a limiting viscosity [η] (liter/g) of the vinyl alcohol polymer (b2) is measured in water at 30° C., and a viscosity-average degree of polymerization P is calculated using the value of the limiting viscosity [η], according to the following equality. It is to be noted that in cases in which the degree of saponification of the vinyl alcohol polymer (b2) is less than 99.5 mol %, the limiting viscosity [η] is measured after saponification until the degree of saponification becomes 99.5 mol % or more.

$$P([\eta]\times10^{4}/8.29)^{(1/0.62)}$$

The degree of saponification of the vinyl alcohol polymer (b2) is preferably 70 mol % or more, more preferably 75 mol % or more, and still more preferably 85 mol % or more. When the degree of saponification is 70 mol % or more, the water solubility of the vinyl alcohol polymer (b2) may be superior, and thus the separability of the multilayer structure may be improved. The degree of saponification of the vinyl alcohol polymer (b2) is preferably 95 mol % or less, more preferably 93 mol % or less, and still more preferably 90 mol % or less. When the degree of saponification is 95 mol % or less, melt formability of the vinyl alcohol polymer (b2) may be superior. The degree of saponification of the vinyl alcohol polymer (b2) is determined in accordance with JIS K6726: 1994.

The vinyl alcohol polymer (b2) is exemplified by polyvinyl alcohol (hereinafter, may be abbreviated to "PVA"), modified PVA, and the like. Of these, in light of solubility in water, PVA is more preferred. The vinyl alcohol polymer (b2) may be contained alone of one type, or two or more types thereof may be contained.

A total of contents of a vinyl alcohol unit and a vinyl ester unit in the vinyl alcohol polymer (b2) is preferably 95 mol % or more. When the total of the contents is 95 mol % or more, solubility of the vinyl alcohol polymer (b2) in water improves, and as a result, separability of the multilayer structure in water may be improved. The total of the contents of the vinyl alcohol unit and the vinyl ester unit is more preferably 97 mol % or more, still more preferably 98 mol % or more, and particularly preferably 99 mol % or more.

The vinyl alcohol polymer (b2) may contain monomer unit(s), other than the vinyl alcohol unit and the vinyl ester unit, within a range not leading to impairment of the effects of the present invention. Examples of such a monomer include: α-olefins such as ethylene, propylene, n-butene, and isobutylene; acrylic acid and salts thereof; acrylic acid esters; methacrylic acid and salts thereof; methacrylic acid esters; acrylamide; acrylamide derivatives such as N-methylacrylamide, N-ethylacrylamide, N,N-dimethylacrylamide, diacetoneacrylamide, and acrylamidepropanesulfonic acid, and salts thereof, acrylamidepropyldimethylamine and salts thereof or quaternary salts thereof, and N-methylolacrylamide and derivatives thereof; methacrylamide; methacrylamide derivatives such as N-methylmethacrylamide, N-ethylmethacrylamide, methacrylamidepropanesulfonic acid and salts thereof, methacrylamidepropyldimethylamine and salts thereof or quaternary salts thereof, and N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid, and fumaric acid, and salts thereof or esters thereof; vinylsilyl compounds such as vinyltrimethoxysilane; isopropenyl acetate; and the like. A percentage content of the unit (monomer unit) derived from these monomers may vary depending on intended usage, purposes in use, and/or the like, and is preferably 10 mol % or less, more preferably less than 5 mol %, still more preferably less than 1 mol %, and particularly preferably less than 0.5 mol %, and may be 0 mol %. It is to be noted that in a case in which the vinyl alcohol polymer (b2) is an ethylene-modified PVA having an ethylene unit, the ethylene unit may be included in all of the monomer units, within the range of 10 mol % or less.

The lower limit of a content of the vinyl alcohol polymer (b2) in the water-soluble layer (B) is preferably 60% by mass, more preferably 70% by mass, and still more preferably 80% by mass. When the content of the vinyl alcohol polymer (b2) in the water-soluble layer (B) is more than or equal to the lower limit, adhesiveness of the interlayer, separability in water, and the like can be improved. The upper limit of the content of the vinyl alcohol polymer (b2) in the water-soluble layer (B) may be 99.9% by mass, may be 99% by mass, or may be 95% by mass.

It is preferred that the water-soluble layer (B) further contains a plasticizer (b3). When the plasticizer (b3) is contained, melt formability with the resin such as the vinyl alcohol polymer (b2), and solubility in the water (W) may be improved. A molecular weight of the plasticizer (b3) is not particularly limited, and is, in light of the peelability, preferably 10,000 or less, more preferably 2,000 or less, still more preferably 200 or less, and particularly preferably 100 or less. The lower limit of a content of the plasticizer (b3) in the water-soluble layer (B) is preferably 3% by mass, more preferably 5% by mass, and still more preferably 8% by mass. The upper limit of the content of the plasticizer (b3) is preferably 45% by mass, more preferably 30% by mass, and still more preferably 20% by mass. The component constituting the plasticizer (b3) is preferably at least one selected from the group consisting of glycerin, polyethylene glycol, polypropylene glycol, polyglycerin, mannitol, sorbitol, and pentaerythritol; more preferably at least one selected from the group consisting of glycerin, polyethylene glycol, mannitol, and sorbitol; and particularly preferably at least one selected from the group consisting of glycerin, mannitol, and sorbitol.

The water-soluble layer (B) may contain other component (s) aside from the alkali metal ion (b1), the vinyl alcohol polymer (b2), or other water-soluble resin, and the plasticizer (b3), within a range not leading to inhibition of the effects of the present invention. Examples of the other component(s) include multivalent metal ions, carboxylic acids, phosphoric acid compounds, oxidization accelerators, antioxidants, heat stabilizers (melt stabilizers), photoinitiators, deodorizers, ultraviolet ray-absorbing agents, antistatic agents, lubricants, colorants, fillers, drying agents, bulking agents, pigments, dyes, processing aids, fire retardants, anti-fogging agents, and the like. A content of the other component in the water-soluble layer (B) is typically 5% by mass or less, preferably 3% by mass or less, and more preferably 1% by mass or less.

The water-soluble layer (B) is preferably constituted from a resin composition containing the vinyl alcohol polymerize (b2). A procedure for preparing the resin composition containing the vinyl alcohol polymer (b2) is not particularly limited, and the preparation may be carried out by any procedure as long as homogenously mixing the alkali metal ion (b1), the vinyl alcohol polymer (b2), and the plasticizer (b3), as well as the other component(s) as needed is enabled. The vinyl alcohol polymer composition can be prepared by, for example: a procedure of blending the alkali metal ion (b1), the vinyl alcohol polymer (b2), and the plasticizer (b3), followed by melt kneading the mixture and pelletization; a procedure of kneading and pelletization in a melt kneading machine, while the alkali metal ion (b1), the vinyl alcohol polymer (b2), and the plasticizer (b3) are separately charged in a certain ratio; a procedure of introducing the alkali metal ion (b1) into the vinyl alcohol polymer (b2) beforehand, followed by blending the plasticizer (b3) therewith, and then melt kneading and pelletization; a procedure of introducing the alkali metal ion (b1) in the vinyl alcohol polymer (b2) beforehand, followed by kneading and pelletization in a melt kneading machine, while the vinyl alcohol polymer (b2) and the plasticizer (b3) are separately charged in a certain ratio; or the like.

The water-soluble layer (B) to be used in the present invention is a layer in which a part or an entirety of the principal component constituting the same is dissolvable in the water (W), and may be a layer in which a part or an entirety of the principal component constituting the same is dissolved by being brought into contact with the water (W) at 20° C. to 95° C. In addition, the water-soluble layer (B) may be a layer in which a part or an entirety of the principal component thereof is dissolved when 1 part by mass of the water-soluble layer (B) is stirred in 100 parts by mass of hot pure water at a temperature of 80° C. for 30 min.

An average thickness per layer of the water-soluble layer (B) is not particularly limited, and the lower limit of the average thickness is preferably 0.1 μm, more preferably 0.3 μm, still more preferably 0.5 μm, and yet more preferably 1 μm. On the other hand, the upper limit of the average thickness is preferably 100 μm, more preferably 60 μm, still more preferably 40 μm, and yet more preferably 20 μm. When the average thickness of the water-soluble layer (B) falls within the above range, adhesiveness of the interlayer under high humidity, separability in water, and the like can be improved.

Adhesive Layer (C)

The adhesive layer (C) is typically a layer having adhesiveness to the water-soluble layer (B) and the other thermoplastic resin layer (D) being an arbitrary layer. The adhesive layer (C) is a layer containing, for example, an adhesive resin as a principal component. The adhesive layer (C) preferably contains a carboxylic acid-modified polyolefin as a principal component. The carboxylic acid-modified polyolefin may be exemplified by modified olefin polymers each containing a carboxyl group, which are obtained by chemically bonding an unsaturated carboxylic acid or an anhydride thereof to an olefin polymer by an addition reaction, a graft reaction, and/or the like. Examples of the unsaturated carboxylic acid or the anhydride thereof include maleic acid, maleic anhydride, fumaric acid, acrylic acid, methacrylic acid, crotonic acid, itaconic acid, citraconic acid, hexahydrophthalic anhydride, and the like, and of these, maleic anhydride may be suitably used. Specifically, one type or a mixture of two or more types selected from maleic anhydride-graft modified polyethylene, maleic anhydride-graft modified polypropylene, maleic anhydride-graft modified ethylene-propylene copolymers, maleic anhydride-graft modified ethylene-ethyl acrylate copolymers, maleic anhydride-graft modified ethylene-vinyl acetate copolymers, and the like may be given as suitable examples.

When a rubber-elastomer component such as polyisobutylene or ethylene-propylene rubber, and/or a polyolefin resin that differs from the polyolefin resin being a matrix of the original adhesive resin is/are mixed with the adhesive resin, the adhesiveness may be improved.

The adhesive layer (C) may be a layer formed from an anchor coating agent, an adhesive, etc. In addition, the adhesive layer (C) can be formed also by: subjecting a surface of one layer of two layers to be adhered (for example, the water-soluble layer (B)) to a treatment with a well-known anchor coating agent; or applying a well-known adhesive on the surface of the one layer. The adhesive is preferably a two-reactive component polyurethane-based adhesive which is used by mixing a polyisocyanate component and a polyol component to allow for a reaction. Also, further enhancing the adhesiveness may be possible by adding a small amount of an additive such as a well-known silane coupling agent to the anchor coating agent and/or the adhesive. Examples of the silane coupling agent include silane coupling agents each having a reactive group such as an isocyanate group, an epoxy group, an amino group, a ureide group, or a mercapto group, but the silane coupling agent is not limited thereto.

An average thickness per layer of the adhesive layer (C) is preferably 0.01 μm or more and 20 μm or less, more preferably 0.03 μm or more and 10 μm or less, and still more preferably 1 μm or more and 5 μm or less.

Other Thermoplastic Resin Layer (D)

It is preferred that the multilayer structure of the present invention further includes the other thermoplastic resin layer (D). The other thermoplastic resin layer (D) is a layer containing a thermoplastic resin as a principal component. The thermoplastic resin constituting the other thermoplastic resin layer (D) is not particularly limited, and examples thereof include: homopolymers of olefins or copolymers thereof, such as linear low density polyethylene, low density polyethylene, medium density polyethylene, high density polyethylene, high density polyethylene, vinyl ester resins, ethylene-propylene copolymers, polypropylene, propylene-α-olefin copolymers (α-olefins having 4 to 20 carbon atoms), polybutene, and polypentene; polyesters such as polyethylene terephthalate; polystyrenes; polyvinyl chlorides; polyvinylidene chlorides; acrylic resins; polycarbonates; chlorinated polyethylenes; chlorinated polypropylenes; and the like. Of these, in light of recyclability, the polyolefins are preferred. A content of the thermoplastic resin in the other thermoplastic resin layer (D) is preferably 80% by mass or more and 100% by mass or less, or may be 90% by mass or more and 99% by mass or less.

In light of separability of the barrier layer (A) in water, the density of the other thermoplastic resin layer (D) is preferably 1.0 $g/cm^3$ or less, more preferably less than 1.0 $g/cm^3$, and still more preferably 0.95 $g/cm^3$ or less. The lower limit of the density of the other thermoplastic resin layer (D) may be, for example, 0.8 $g/cm^3$, or may be 0.85 $g/cm^3$.

The other thermoplastic resin layer (D) may contain additive(s), which may be exemplified by a heat stabilizer, an antioxidant, an ultraviolet ray-absorbing agent, a plasticizer, an antistatic agent, a lubricant, a colorant, a filler, a stabilizer, a surfactant, a crosslinking agent, a fiber-reinforcing agent, and the like. Of these, containing at least one selected from the group consisting of the antioxidant, the ultraviolet ray-absorbing agent, and the colorant is preferred.

An average thickness per layer of the other thermoplastic resin layer (D) is preferably 1 μm or more and 1,000 μm or less, more preferably 3 μm or more and 500 μm or less, and still more preferably 5 μm or more and 200 μm or less.

Multilayer Structure

In the multilayer structure of the present invention, the adhesive layer (C) is laminated via the water-soluble layer (B) on one or both faces of the barrier layer (A). In this case, an optional layer may be provided in addition to the barrier layer (A), the water-soluble layer (B), the adhesive layer (C), and the other thermoplastic resin layer (D). In the case in which the other thermoplastic resin layer (D) is provided, it is preferred that the water-soluble layer (B) and the other thermoplastic resin layer (D) are adhered via the adhesive layer (C). It is to be noted that the number of layers of each layer is not particularly limited, and may be one, or two or more.

In producing the multilayer structure, a multilayer structure having a layer configuration of {(C)/(B)/(A)} is to be finally obtained. In particular, a multilayer structure having a layer configuration of {(D)/(C)/(B)/(A)/(B)/(C)/(D)} is preferred. A lamination procedure of the same may be exemplified by: (1) a procedure of coextruding each resin; (2) a procedure of producing a multilayer film having the barrier layer (A) and the water-soluble layer (B) (for example, a multilayer film having a layer structure of {(B)/(A)/(B)}), a multilayer film having the barrier layer (A), the water-soluble layer (B), and the adhesive layer (C) (for example, a multilayer film having a layer structure of {(C)/(B)/(A)/(B)/(C)}), or the like beforehand, and melt extruding an other resin thereto; and (3) a procedure of dry laminating to the multilayer film, a monolayer film and/or a multilayer film constituted from an other resin by using a well-known adhesive; and the like. Alternatively, in a case of coextrusion by inflation molding, it is possible to obtain the multilayer structure by: forming a multilayer film having a layer configuration of [external side] {(D)/(C)/(B)/(A)/(B)/(C)} [internal side] beforehand, and then fusing internal sides of its tubular film each other by heat or the like, followed by winding. A molding temperature during melt molding is typically selected from the range of 150 to 300° C.

The multilayer structure of the present invention is not limited to one having the layer configuration of {(D)/(C)/(B)/(A)/(B)/(C)/(D)} described above, and may be one having at least nine layers such as {(D)/(X)/(C)/(B)/(A)/(B)/(C)/(X)/(D)}, {(X)/(D)/(C)/(B)/(A)/(B)/(C)/(D)/(X)}, {(X)/(D)/(X)/(C)/(B)/(A)/(B)/(C)/(X)/(D)/(X)}, or the like, obtained by further providing another layer (X) on an external side or an internal side of the other thermoplastic resin layer (D). Resins and/or compositions used in layers, to which the same symbol is attached in the layer configuration, may be the same or different. It is to be noted that in the multilayer structure of the present invention, in the case in which a plurality of the adhesive layers (C) and the other thermoplastic resin layers (D) are employed, different types of resins may be used in each. Furthermore, it is preferred that the multilayer structure of the present invention does not include paper. In the multilayer structure of the present invention, it is also preferred that all the layers contain the resin as a principal component.

The lower limit of the number of the layers of the multilayer structure of the present invention is 3, preferably 5, and more preferably 7. The upper limit of the number of the layers may be, for example, 15, may be 11, or may be 9 or 7. The layer configuration of the multilayer structure of the present invention may have a symmetrical layer configuration with the barrier layer (A) at a center, for example, or may have an asymmetrical layer configuration. With respect to the symmetrical layer configuration, only the order of the arrangement of the layers may be symmetrical, or the symmetric property may also involve the thickness of each layer.

The solubility parameter ($SP_A$) of the resin constituting the principal component of the barrier layer (A) in the multilayer structure of the present invention is preferably 11.0 $(cal/cm^3)^{1/2}$ or more. When the solubility parameter of the barrier layer (A) falls within the above range, the alkali metal ion (b1) transferred from the water-soluble layer (B) may become more readily receivable by the barrier layer (A), and as a result, viscosity stability of the resin of the barrier layer (A) after separation and collection may be improved. The solubility parameter ($SP_A$) is more preferably 12.5 $(cal/cm^3)^{1/2}$ or more, and still more preferably 13.0 $(cal/cm^3)^{1/2}$ or more. The upper limit of the solubility parameter ($SP_A$) may be, for example, 15.0 $(cal/cm^3)^{1/2}$, or may be 14.0 $(cal/cm^3)^{1/2}$.

It is to be noted that as referred to herein, the solubility parameter means a value determined by the Fedors' formula (Polym. Eng. Sci., 14[2],147 (1974)).

The ratio ($SP_A/SP_B$) of the solubility parameter ($SP_A$) of the barrier layer (A) to the solubility parameter ($SP_B$) of the resin constituting the principal component of the water-soluble layer (B) in the multilayer structure of the present invention is preferably 0.60 or more and 0.95 or less. When the ratio of the solubility parameter is 0.60 or more, receiving of the alkali metal ion (b1) transferred from the water-soluble layer (B) to the barrier layer (A) is facilitated, and as a result viscosity stability of the resin of the barrier layer (A) after separation and collection may be improved. The lower limit of the ratio of the solubility parameter is more preferably 0.70, and still more preferably 0.80. On the other hand, when the ratio of the solubility parameter is 0.95 or less, affinity of the water-soluble layer (B) to water increases, and as a result, separability of the multilayer structure in water may be improved. The upper limit of the ratio of the solubility parameter is more preferably 0.94, and still more preferably 0.92. The solubility parameter ($SP_B$) of the resin constituting the principal component of the water-soluble layer (B) is, for example, preferably 13.0 $(cal/cm^3)^{1/2}$ or more and 18.0 $(cal/cm^3)^{1/2}$ or less, and more preferably 14.0 $(cal/cm^3)^{1/2}$ or more and 16.5 $(cal/cm^3)^{1/2}$ or less.

It is preferred that the density of the barrier layer (A) in the multilayer structure of the present invention is 1.0 $g/cm^3$ or more, and the density of an entirety of layers, other than the barrier layer (A) and the water-soluble layer (B), is 1.0 $g/cm^3$ or less. When the density falls within the above range, sedimentation of the barrier layer (A) in water occurs after separation of the multilayer structure in water, and layers (for example, the adhesive layer (C) and the other thermoplastic resin layer (D)), other than the barrier layer (A) and the water-soluble layer (B), float in water, whereby the separability may be improved. The density of the barrier layer (A) is more preferably more than 1.00 $g/cm^3$, still more preferably 1.05 $g/cm^3$ or more, and yet more preferably 1.10 $g/cm^3$ or more. The upper limit of the density of the barrier layer (A) may be, for example, 1.4 $g/cm^3$, or may be 1.3 $g/cm^3$. The density of the entirety of the layers (for example, the adhesive layer (C) and the other thermoplastic resin layer (D)), other than the barrier layer (A) and the water-soluble layer (B), is more preferably less than 1.00 $g/cm^3$, still more preferably 0.98 $g/cm^3$ or less, and yet more preferably 0.95 $g/cm^3$ or less. The lower limit of the density of the entirety of the layers, other than the barrier layer (A) and the water-soluble layer (B), may be 0.8 $g/cm^3$, or may be 0.85 $g/cm^3$.

An oxygen transmission rate (OTR) of the multilayer structure of the present invention is not particularly limited and may be adjusted depending on the intended usage, and is preferably 5 $cc/(m^2 \cdot day \cdot atm)$ or less. The multilayer structure having the OTR falling within this range may be suitably used as a packaging material and the like. The OTR is more preferably 4 $cc/(m^2 \cdot day \cdot atm)$ or less, still more preferably 3 $cc/(m^2 \cdot day \cdot atm)$ or less, and particularly preferably 2 $cc/(m^2 \cdot day \cdot atm)$ or less. The OTR is measured in accordance with JIS K 7126-2 (Equal Pressure Method; 2006), and specifically, a procedure disclosed in EXAMPLES is adopted.

Moreover, to each layer of the multilayer structure of the present invention, for the purpose of improving molding processibility as well as a variety of physical properties, various types of the additives described above and/or a modification agent, a filler, an other resin, etc., may be added, within the range not to inhibit the effects of the present invention.

Separation Method and Recycling Method

The separation method of the present invention is achieved by: bringing the multilayer structure to be in contact with water (W) having a Temperature of 20° C. to 95° C. to dissolve a part or all of the water-soluble layer (B); and sedimenting a substance (X) including the barrier layer (A) and floating a substance (Y) including the adhesive layer (C) in the water (W). In this method, by elevating the temperature of the water (W), an effect of eliminating attached contaminants and the like may be expected, while separation efficiency can be lowered due to convection, etc., of the water (W). Furthermore, in the case in which the multilayer structure of the present invention incudes the other thermoplastic resin layer (D), it is preferred that the substance (Y) includes the adhesive layer (C) and the other thermoplastic resin layer (D). Moreover, the size of the multilayer structure to be sunken into the water (W) is not particularly limited, and for promoting delamination in the case of the multilayer structure, the size is preferably smaller than 10 cm square. Additionally, immediately after sinking, vigorous stirring to promote the delamination, followed by leaving to stand enables the separation to be achieved efficiently. After completion of the separation, sedimented substance (X) and floating substance (Y) are each collected, washed with pure water, etc., as needed, dried, and thereafter melt molded by using an extruder, whereby repelletization as a recycled resin is enabled. By using thus obtained pellets, a variety of molded products may be produced. In other words, the recycling method for the multilayer structure of the present invention is achieved by independently melt molding each of the substance (X) and the substance (Y) collected in the separation method described above.

It is to be noted that in a case in which the substance (X) and the substance (Y) have formed multilayer structures, the substance (X) and the substance (Y) can be efficiently separated by grinding of the multilayer structure before the multilayer structure is sunken into the water (W), or in the water (W) to give crushed pieces.

In this method, a chloride salt such as sodium chloride or potassium chloride, or the like may be dissolved as a solute in the water (W). In other words, the water (W) may be either an aqueous solution containing a solute, or pure water not containing a solute.

In the case in which the chloride salt or the like is dissolved as the solute in the water (W), by using an aqueous solution having a specific concentration range, substances having a comparatively greater specific gravity than the specific gravity of water can be separated stably and economically. In light of economic efficiency and handleability, a concentration of the chloride salt or the like needed for attaining a necessary specific gravity w of the water (W) is preferably 40% by mass or less. When the concentration is 40% by mass or less, a cost for providing the chloride salt or the like can be saved, and a washing step after the separation can be efficiently carried out.

Furthermore, in light of stability of the separating step, the concentration of the chloride salt or the like needed for attaining a necessary specific gravity w of the water (W) is preferably less than a concentration of a saturated solution of the chloride salt or the like by 10% by mass or more. When the difference between the concentration of the saturated solution of the chloride salt or the like, and the concentration of the chloride salt or the like needed for attaining a necessary specific gravity w of the water (W) is 10% by mass or more, a time period required for dissolution of the chloride salt or the like can be shortened and deposition of the chloride salt or the like onto a separation bath and/or the substances after the separation may be inhibited, thereby enabling stabilization of the step to be contemplated.

EXAMPLES

Hereinafter, the present invention is further specifically described by way of Examples, but the present invention is not in anyhow limited to these Examples.

Example 1

(1) Production of Pelletized EVOH Resin Composition

Stearic acid (manufactured by FUJIFILM Wako Pure Chemical Corporation) and a pelletized EVOH resin (ethylene content: 38 mol %, degree of saponification: 99.6 mol %, MFR (at 190° C., under 2.16 kg load): 1.69 g/10 min, oxygen transmission rate (under conditions of 20° C. and 65% RH): 0.71 cc 20 μm/($m^2$·day·atm); containing 250 ppm sodium ion, 90 ppm phosphate ion, and 180 ppm (in terms of boron element) orthoboric acid as a boron compound) were melt kneaded such that the content of stearic acid in the resin composition to be obtained accounted for 1,100 ppm, whereby a pelletized EVOH resin composition was obtained. The melt kneading was conducted by using a 25 mm extruder manufactured by Toyo Seiki Seisaku-sho, Ltd., (D (mm)=25, L/D=25, compression ratio=2.0, screw: fully intermeshing co-rotation type), such that a resin temperature became 220° C. It is to be noted that the specific gravity of the pelletized EVOH resin composition thus obtained was 1.2. Furthermore, the solubility parameter of the EVOH contained in the pelletized EVOH resin composition was 13.5 $(cal/cm^3)^{1/2}$.

(2) Production of Pelletized PVA Resin Composition

Viscosity-Average Degree of Polymerization and Degree of Saponification

The viscosity-average degree of polymerization and the degree of saponification of the vinyl alcohol polymer were determined according to a method disclosed in JIS K6726 (1994).

PVA having a viscosity-average degree of polymerization of 800 and a degree of saponification of 88 mol % was obtained by polymerizing vinyl acetate according to a common procedure, and saponifying a thus resulting vinyl acetate polymer according to a common procedure. After mixing 87 parts by mass of the PVA thus obtained and 13 parts by mass of glycerin as a plasticizer by using a planetary mixer, an aqueous sodium acetate solution was added thereto such that a content of a sodium ion became 800 ppm, and then melt kneading was conducted to give a pelletized PVA resin composition. The melt kneading was conducted by using a 25 mm extruder manufactured by Toyo Seiki Seisaku-sho, Ltd., (D (mm)=25, L/D=25, compression ratio=2.0, screw: fully intermeshing co-rotation type), such that a resin temperature became 220° C.

(3) Production of Multilayer Structure

By using an apparatus for forming a coextruded-multilayer cast film, a multilayer structure (seven layer-coextruded multilayer cast film having average layer thicknesses and a layer configuration of: (D)/(C)/(B)/(A)/(B)/(C)/(D)=50 μm/5 μm/5 μm/5 μm/5 μm/5 μm/50 μm) was obtained, in which: the barrier layer (A) consisted of the EVOH resin composition, the water-soluble layer (B) consisted of the PVA resin composition; the adhesive layer (C) consisted of maleic anhydride-modified polyethylene ("Admer NF518" manufactured by Mitsui Chemicals, Inc.); and the other thermoplastic resin layer (D) consisted of low density polyethylene (LDPE; "Novatec LJ400" manufactured by Japan Polyethylene Corporation). Conditions for film formation in this procedure are shown below.

Coextrusion Conditions

- extrusion temperature of barrier layer (A): feeding zone/compression zone/metering zone/die=170/210/210/210° C.
- extrusion temperature of water-soluble layer (B): feeding zone/compression zone/metering zone/die=170/200/200/210° C.
- extrusion temperature of adhesive layer (C): feeding zone/compression zone/metering zone/die=170/210/210/210° C.
- extrusion temperature of other thermoplastic resin layer (D): feeding zone/compression zone/metering zone/die=170/210/210/210° C. extruder:
- 32φ extruder for the barrier layer (A), model UT-32-H (manufactured by Research Laboratory of Plastics Technology Co., Ltd.)
- 40φ extruder for the water-soluble layer (B), model GT-40-A (manufactured by Research Laboratory of Plastics Technology Co., Ltd.)
- 40φ extruder for the adhesive layer (C), model GT-40-L (manufactured by Research Laboratory of Plastics Technology Co., Ltd.)
- 65φ extruder for the other thermoplastic resin layer (D), model SZW65GT-22MG-STD (manufactured by Technovel Corporation)
- T die: width=600 mm for seven layers each selected from four types (manufactured by Cloeren Incorporated)
- temperature of cooling rolls: 60° C.
- drawing speed: 4.5 m/min (4) Evaluation of Adhesiveness As a marker of interlayer adhesiveness between the water-soluble layer (B) and the adhesive layer (C) in the multilayer structure produced in section (3), an adhesion strength under high humidity conditions, i.e., the following conditions. After the multilayer structure was subjected to moisture conditioning in an atmosphere of 40° C. and 90% RH for 7 days, a strip test piece of 15 mm×200 mm was cut out. With respect to the test piece thus obtained, a T-type peel strength (gf/15 mm) was measured with an autograph "model AGS-H" manufactured by Shimadzu Corporation, under a condition involving a distance between chucks of 50 mm and a strain rate of 250 mm/min. The measurement was carried out on five test pieces, and an averaged value therefrom was defied as the "adhesion strength". Criteria for the evaluation were as in the following. The results are shown in Table 1.

- A: due to the adhesive force being great, peeling failed, or the adhesion strength being 150 g/15 mm or more
- B: the adhesion strength being 50 g/15 mm or more and less than 150 g/15 mm
- C: the adhesion strength being 15 g/15 mm or more and less than 50 g/15 mm
- D: the adhesion strength being less than 15 g/15 mm (5) Evaluation of Separability (5-1) Evaluation of Peelability Ten regular tetragonal pieces of 1 cm×1 cm were cut out from the multilayer structure produced in section (3) to give test pieces. The test pieces thus obtained were placed into pure water at a temperature of 80° C., as the water (W), and after the mixture was stirred for 30 min and left to stand, the peelability was evaluated. Criteria for the evaluation were as in the following. The results are shown in Table 1.

- A: during the stirring, separation being promptly achieved, without peeling, accompanied by the film left in the multilayer being two or fewer pieces
- B: during the stirring, separation being promptly achieved, without peeling, accompanied by the film left in the multilayer being three to four pieces
- C: during the stirring, separation slowly progressing, without peeling, accompanied by the film left in the multilayer being five to six pieces
- D: during the stirring, separation not being completed even after the time elapsed, or peeling not occurring accompanied by the film left in the multilayer being seven or more (5-2) Evaluation of Sortability The test piece was produced similarly to section (5-1) and tested. After testing, the test pieces were left to stand, whereby sortability of the film on the side of the barrier layer (A) and the film on the side of the adhesive layer (C), i.e., a possibility of sorting by sedimentation or floating of both, was evaluated according to the following criteria. The results are shown in Table 1.

- A: after stopping the stirring, the film on the side of the barrier layer (A) and the film on the side of the adhesive layer (C) each being sedimented or floated in the water (W), thereby being separated to the upper part or the lower part in the water (W)
- B: after stopping the stirring, the film on the side of the barrier layer (A) and the film on the side of the adhesive layer (C) both being sedimented or floated in the water (W), thereby being assembled to either the upper part or the lower part in the water (W)

(6) Viscosity Stability of Barrier Layer (A) after Separation and Collection

First, in order to measure a torque value before the separation, the EVOH resin composition produced in the section (1) was used to measure a torque value ($T_1$) after kneading with a roller mixer R60 manufactured by Toyo Seiki Seisaku-sho, Ltd., under the following conditions for 60 min.

Next, in order to measure a torque value after the separation, 200 regular tetragonal pieces of 1 cm×1 cm were cut out from the multilayer structure produced in the section (3) to give test pieces. The test pieces thus obtained were placed into pure water at a temperature of 80° C., as the water (W), and the mixture was stirred for 1 hour and left to stand, whereby separation of the multilayer structure was performed. Thereafter, only film pieces sedimented in the water (W) were taken out and dried, and the moisture in the film was eliminated. A similar operation was repeated to give 100 g of dried film pieces of the barrier layer (A). The film pieces thus obtained were used to knead with a roller mixer $R^{60}$ manufactured by Toyo Seiki Seisaku-sho, Ltd., under the following conditions, and a torque value after 60 min passed was defined as $T_2$.

Based on resulting $T_1$ and $T_2$, the viscosity stability of the barrier layer (A) after separation was evaluated as in the following.

Superior evaluation represents superior viscosity stability after the separation and collection. The results are shown in Table 1.

Mixer Conditions

- screw rotation speed: 100 rpm
- temperature setting: 230° C.

time period: 60 min
atmosphere: nitrogen
A: $0.8<T_2/T_1\leq 1.2$
B: $0.5\leq T_2/T_1\leq 0.8$, $1.2<T_2/T_1\leq 1.5$
C: $0.3\leq T_2/T_1<0.5$, $1.5<T\ 2/T\ 1\leq 2$
D: $T\ 2/T_1<0.3$, $2<T_2/T_1$

Examples 2 to 10, 14, and Comparative Examples 1 to 3

Pelletized EVOH resin compositions and multilayer structures were each produced similarly to Example 1 except that components constituting the barrier layer (A) and the water-soluble layer (B) were changed as shown in Tables 1 and 2, and various types of physical properties were evaluated. It is to be noted that in Example 2, a blend of PVA having a viscosity-average degree of polymerization being 600 and a degree of saponification being 80 mol %, with PVA having a viscosity-average degree of polymerization being 800 and a degree of saponification being 74 mol % in a weight ratio of 70/30 was used as the vinyl alcohol polymer (b2). In Example 3, PEG (molecular weight: 1,000 ("CARBOWAX" 1000 manufactured by Dow Chemical Company)) was used as the plasticizer (b3) in place of glycerin. In Example 4, mannitol was used as the plasticizer (b3) in place of glycerin. In Example 5, sorbitol was used as the plasticizer (b3) in place of glycerin. In Example 9, a potassium hydroxide/methanol solution (concentration: 4% by mass) was used as a saponification catalyst solution in the saponification step of PVA, in place of the sodium hydroxide/methanol solution (concentration: 4% by mass). In Example 10, ethylene-modified PVA (modification amount with ethylene: 8 mol %) was used in place of the PVA. Furthermore, in Comparative Example 1, without providing the water-soluble layer (B), a multilayer structure of a five layer-coextruded multilayer cast film having average layer thicknesses and a layer configuration of: (D)/(C)/(A)/(C)/(D)=50 μm/5 μm/5 μm/5 μm/50 μm was obtained. The results are shown in Tables 1 and 2. Moreover, in Comparative Example 3, gelation in the film formation was so severe that producing an appropriate multilayer structure failed.

Example 11

A multilayer structure was produced similarly to Example 1 except that polyamide 6/66 ("Ultramid C40L" manufactured by BASF Ltd.) was used as the barrier layer (A) and the temperature of the coextrusion was changed as follows, and various types of physical properties were evaluated. The results are shown in Table 2.

Coextrusion Conditions

- extrusion temperature of barrier layer (A): feeding zone/compression zone/metering zone/die=200/220/220/220° C.
- extrusion temperature of water-soluble layer (B): feeding zone/compression zone/metering zone/die=170/200/200/220° C.
- extrusion temperature of adhesive layer (C): feeding zone/compression zone/metering zone/die=170/210/210/220° C.
- extrusion temperature of other thermoplastic resin layer (D): feeding zone/compression zone/metering zone/die=170/210/210/220° C.

Example 12

A multilayer structure was produced similarly to Example 1 except that polyamide 12 ("UBESTA 3030XA" manufactured by Ube Industries, Ltd.) was used as the barrier layer (A) and the temperature of the coextrusion was changed as follows, and various types of physical properties were evaluated. The results are shown in Table 2.

Coextrusion Conditions

- extrusion temperature of the barrier layer (A): feeding zone/compression zone/metering zone/die=215/220/220/220° C.
- extrusion temperature of the water-soluble layer (B): feeding zone/compression zone/metering zone/die=170/200/200/220° C.
- extrusion temperature of the adhesive layer (C): feeding zone/compression zone/metering zone/die=170/220/220/220° C.
- extrusion temperature of the other thermoplastic resin layer (D): feeding zone/compression zone/metering zone/die=170/220/220/220° C.

Example 13

A multilayer structure was produced similarly to Example 1 except that the pelletized EVOH resin and sodium stearate were not melt kneaded and the pelletized EVOH resin was used in place of the pelletized EVOH resin composition to form the barrier layer (A), and various types of physical properties were evaluated. The results are shown in Table 2.

Example 15

A multilayer structure ((D)/(B)/(A)/(B)/(D)) was produced similarly to Example 1 except that the resin was not charged into the extruder for the adhesive layer (C). The other thermoplastic resin layer (D) was eliminated from the multilayer structure thus obtained to give a multilayer structure ((B)/(A)/(B)) of three layers each selected from two types. A resultant multilayer structure film of three layers each selected from two types, and a biaxially stretched polyethylene terephthalate film ("Lumirror (registered trademark) P60" manufactured by Toray Industries, Inc., average thickness: 12 μm) were each cut away to give a size of A4, then an adhesive for dry lamination was applied on both faces of the multilayer film. Dry lamination was conducted by drying at 80° C. for 3 min such that an outer layer was a polyester film and an inner layer was the multilayer structure of three layers each selected from two types, whereby a transparent laminated film consisting of seven layers was obtained. As the adhesive for dry lamination, two-component adhesives ("TAKELAC A-520" available from Mitsui Chemicals, Inc. Co. Ltd. and "TAKENATE A-50" available from Mitsui Chemicals, Inc. Co. Ltd.) were employed. The amount of the adhesive to be applied was set to be 4.0 g/m 2, and lamination was followed by aging carried out at 40° C. for 3 days to give a laminated film. Various types of physical properties were evaluated similarly to Example 1 on the laminated film thus obtained. The results are shown in Table 2.

Example 16

Various types of physical properties were evaluated similarly to Example 1 except that the water (W) used for: evaluations of separability of the laminated film obtained similarly to Example 15; and the viscosity stability of the barrier layer (A) after separation and collection was changed to a 25% by mass aqueous sodium chloride solution (specific gravity: 1.20), and the film floated after being left to stand was collected. The results are shown in Table 2.

TABLE 1

| | | | Example 1 | Example 2 | Example 3 | Example 4 | Example 5 | Example 6 |
|---|---|---|---|---|---|---|---|---|
| Barrier layer (A) | PA or EVOH (a1) | type | EVOH-38 | EVOH-38 | EVOH-38 | EVOH-38 | EVOH-38 | EVOH-38 |
| | Alkali metal ion (a2) | solubility parameter ($SP_A$) [$(cal/cm^3)^{1/2}$] | 13.5 | 13.5 | 13.5 | 13.5 | 13.5 | 13.5 |
| | | type | Na | Na | Na | Na | Na | Na |
| | | content [ppm] | 250 | 250 | 250 | 250 | 250 | 250 |
| | Higher aliphatic acid or a salt thereof | type | stearic acid | stearic acid | stearic acid | stearic acid | stearic acid | stearic acid |
| | | content [ppm, in terms of higher aliphatic acid] | 1,100 | 1,100 | 1,100 | 1,100 | 1,100 | 45 |
| | Boron compound | content [ppm, in terms of boron element] | 180 | 180 | 180 | 180 | 180 | 180 |
| | density [g/cm$^3$] | | 1.2 | 1.2 | 1.2 | 1.2 | 1.2 | 1.2 |
| Water-soluble layer (B) | Alkali metal ion (b1) | type | Na | Na | Na | Na | Na | Na |
| | | content [ppm] | 800 | 400 | 800 | 800 | 800 | 800 |
| | Vinyl alcohol polymer (b2) | type | PVA | PVA | PVA | PVA | PVA | PVA |
| | | viscosity-average degree of polymerization | 800 | 600/800 | 800 | 800 | 800 | 800 |
| | | degree of saponification[mol %] | 88 | 80/74 | 88 | 88 | 88 | 88 |
| | | total of contents of vinyl alcohol unit and vinyl acetate unit [mol %] | 99.9 | 99.9/99.9 | 99.9 | 99.9 | 99.9 | 99.9 |
| | | solubility parameter ($SP_A$) [$(cal/cm^3)^{1/2}$] | 15.3 | 14.6 | 15.3 | 15.3 | 15.3 | 15.3 |
| | Plasticizer (b3) | type | glycerin | — | PEG | mannitol | sorbitol | glycerin |
| | | content [%] | 13 | — | 13 | 13 | 13 | 13 |
| $SP_A/SP_B$ | | | 0.88 | 0.93 | 0.88 | 0.88 | 0.88 | 0.88 |
| Adhesive layer (C) | | type | maleic anhydride-modified PE | maleic anhydride-modified PE | maleic anhydride-modified PE | maleic anhydride-modified PE | maleic anhydride-modified PE | maleic anhydride-modified PE |
| | | density [g/cm$^3$] | 0.92 | 0.92 | 0.92 | 0.92 | 0.92 | 0.92 |
| Other thermoplastic resin layer (D) | | type | LDPE | LDPE | LDPE | LDPE | LDPE | LDPE |
| | | density [g/cm$^3$] | 0.92 | 0.92 | 0.92 | 0.92 | 0.92 | 0.92 |
| Density of entirety of adhesive layer (C) and other thermoplastic resin layer (D) [g/cm$^3$] | | | 0.92 | 0.92 | 0.92 | 0.92 | 0.92 | 0.92 |
| Water (W) | | | pure water | pure water | pure water | pure water | pure water | pure water |
| Evaluation of characteristics | adhesiveness (under high humidity) | | A | B | A | A | A | A |
| | separability | peelability | A | B | B | A | A | A |
| | | sortability | A | A | A | A | A | A |
| | viscosity stability of barrier layer (A) after separation and collection | | A | A | A | A | A | A |

| | | | Example 7 | Example 8 | Example 9 | Example 10 |
|---|---|---|---|---|---|---|
| Barrier layer (A) | PA or EVOH (a1) | type | EVOH-38 | EVOH-38 | EVOH-38 | EVOH-38 |
| | Alkali metal ion (a2) | solubility parameter ($SP_A$) [$(cal/cm^3)^{1/2}$] | 13.5 | 13.5 | 13.5 | 13.5 |
| | | type | Na | Na | Na | Na |
| | | content [ppm] | 250 | 250 | 250 | 250 |
| | Higher aliphatic acid or a salt thereof | type | stearic acid | stearic acid | stearic acid | stearic acid |
| | | content [ppm, in terms of higher aliphatic acid] | 1,100 | 1,100 | 1,100 | 1,100 |
| | Boron compound | content [ppm, in terms of boron element] | 180 | 180 | 180 | 180 |
| | density [g/cm$^3$] | | 1.2 | 1.2 | 1.2 | 1.2 |
| Water-soluble layer (B) | Alkali metal ion (b1) | type | Na | Na | K | Na |
| | | content [ppm] | 400 | 800 | 800 | 400 |
| | Vinyl alcohol polymer (b2) | type | PVA | PVA | PVA | ethylene-modified PVA |
| | | viscosity-average degree of polymerization | 800 | 350 | 800 | 350 |
| | | degree of saponification[mol %] | 88 | 88 | 88 | 98 |
| | | total of contents of vinyl alcohol unit and vinyl acetate unit [mol %] | 99.9 | 99.9 | 99.9 | 92 |
| | | solubility parameter ($SP_A$) [$(cal/cm^3)^{1/2}$] | 15.3 | 15.3 | 15.3 | 15.8 |
| | Plasticizer (b3) | type | glycerin | glycerin | glycerin | — |
| | | content [%] | 13 | 13 | 13 | — |
| $SP_A/SP_B$ | | | 0.88 | 0.88 | 0.88 | 0.86 |
| Adhesive layer (C) | | type | maleic anhydride-modified PE | maleic anhydride-modified PE | maleic anhydride-modified PE | maleic anhydride-modified PE |
| | | density [g/cm$^3$] | 0.92 | 0.92 | 0.92 | 0.92 |
| Other thermoplastic resin layer (D) | | type | LDPE | LDPE | LDPE | LDPE |
| | | density [g/cm$^3$] | 0.92 | 0.92 | 0.92 | 0.92 |
| Density of entirety of adhesive layer (C) and other thermoplastic resin layer (D) [g/cm$^3$] | | | 0.92 | 0.92 | 0.92 | 0.92 |
| Water (W) | | | pure water | pure water | pure water | pure water |
| Evaluation of characteristics | adhesiveness (under high humidity) | | B | B | A | B |
| | separability | peelability | A | A | A | C |
| | | sortability | A | A | A | A |
| | viscosity stability of barrier layer (A) after separation and collection | | B | B | B | B |

TABLE 2

| | | | Example 11 | Example 12 | Example 13 | Example 14 | Example 15 |
|---|---|---|---|---|---|---|---|
| Barrier layer (A) | PA or EVOH (a1) | type | PA6/66 | PA12 | EVOH-38 | EVOH-38 | EVOH-38 |
| | | solubility parameter ($SP_A$) [$(cal/cm^3)^{1/2}$] | 11.6 | 9.9 | 13.5 | 13.5 | 13.5 |
| | alkali metal ion (a2) | type | — | — | Na | Na | Na |
| | | content [ppm] | — | — | 250 | 250 | 250 |
| | higher aliphatic acid or a salt thereof | type | — | — | — | stearic acid | stearic acid |
| | | content [ppm, in terms of higher aliphatic acid] | — | — | — | 1,100 | 1,100 |
| | boron compound | content [ppm, in terms of boron element] | — | — | 180 | 400 | 180 |
| | density [$g/cm^3$] | | 1.1 | 1.0 | 1.2 | 1.2 | 1.2 |
| Water-soluble layer (B) | alkali metal ion (b1) | type | Na | Na | Na | Na | Na |
| | | content [ppm] | 800 | 800 | 800 | 800 | 800 |
| | vinyl alcohol polymer (b2) | type | PVA | PVA | PVA | PVA | PVA |
| | | viscosity-average degree of polymerization | 800 | 800 | 800 | 800 | 800 |
| | | degree of saponification[mol %] | 88 | 88 | 88 | 88 | 88 |
| | | total of contents of vinyl alcohol unit and vinyl acetate unit [mol %] | 99.9 | 99.9 | 99.9 | 99.9 | 99.9 |
| | | solubility parameter ($SP_A$) [$(cal/cm^3)^{1/2}$] | 15.3 | 15.3 | 15.3 | 15.3 | 15.3 |
| | plasticizer (b3) | type | glycerin | glycerin | glycerin | glycerin | glycerin |
| | | content [%] | 13 | 13 | 13 | 13 | 13 |
| $SP_A/SP_B$ | | | 0.76 | 0.65 | 0.88 | 0.88 | 0.88 |
| Adhesive layer (C) | | type | maleic anhydride-modified PE | maleic anhydride-modified PE | maleic anhydride-modified PE | maleic anhydride-modified PE | adhesive |
| | | density [$g/cm^3$] | 0.92 | 0.92 | 0.92 | 0.92 | 1.20 |
| Other thermoplastic resin layer (D) | | type | LDPE | LDPE | LDPE | LDPE | PET |
| | | density [$g/cm^3$] | 0.92 | 0.92 | 0.92 | 0.92 | 1.38 |
| Density of entirety of adhesive layer (C) and other thermoplastic resin layer (D) [$g/cm^3$] | | | 0.92 | 0.92 | 0.92 | 0.92 | 1.34 |
| Water (W) | | | pure water | pure water | pure water | pure water | pure water |
| Evaluation of characteristics | | adhesiveness (under high humidity) | A | A | A | A | A |
| | | separability — peelability | A | A | A | A | A |
| | | separability — sortability | A | A | A | A | B |
| | viscosity stability of barrier layer (A) after separation and collection | | B | C | B | B | A |

| | | | Example 16 | Comparative Example 1 | Comparative Example 2 | Comparative Example 3 |
|---|---|---|---|---|---|---|
| Barrier layer (A) | PA or EVOH (a1) | type | EVOH-38 | EVOH-38 | EVOH-38 | EVOH-38 |
| | | solubility parameter ($SP_A$) [$(cal/cm^3)^{1/2}$] | 13.5 | 13.5 | 13.5 | 13.5 |
| | alkali metal ion (a2) | type | Na | Na | Na | Na |
| | | content [ppm] | 250 | 250 | 250 | 250 |
| | higher aliphatic acid or a salt thereof | type | stearic acid | stearic acid | stearic acid | stearic acid |
| | | content [ppm, in terms of higher aliphatic acid] | 1,100 | 1,100 | 1,100 | 1,100 |
| | boron compound | content [ppm, in terms of boron element] | 180 | 180 | 180 | 180 |
| | density [$g/cm^3$] | | 1.2 | 1.2 | 1.2 | 1.2 |
| Water-soluble layer (B) | alkali metal ion (b1) | type | Na | — | Na | Na |
| | | content [ppm] | 800 | — | 5 | 4,000 |
| | vinyl alcohol polymer (b2) | type | PVA | — | PVA | PVA |
| | | viscosity-average degree of polymerization | 800 | — | 800 | 800 |
| | | degree of saponification[mol %] | 88 | — | 88 | 88 |
| | | total of contents of vinyl alcohol unit and vinyl acetate unit [mol %] | 99.9 | — | 99.9 | 99.9 |
| | | solubility parameter ($SP_A$) [$(cal/cm^3)^{1/2}$] | 15.3 | — | 15.3 | 15.3 |
| | plasticizer (b3) | type | glycerin | — | glycerin | glycerin |
| | | content [%] | 13 | — | 13 | 13 |
| $SP_A/SP_B$ | | | 0.88 | — | 0.88 | 0.88 |
| Adhesive layer (C) | | type | adhesive | maleic anhydride-modified PE | maleic anhydride-modified PE | maleic anhydride-modified PE |
| | | density [$g/cm^3$] | 1.20 | 0.92 | 0.92 | 0.92 |

TABLE 2-continued

| | | | | | | |
|---|---|---|---|---|---|---|
| Other thermoplastic resin layer (D) | type | | PET | LDPE | LDPE | LDPE |
| | density [g/cm$^3$] | | 1.38 | 0.92 | 0.92 | 0.92 |
| Density of entirety of adhesive layer (C) and other thermoplastic resin layer (D) [g/cm$^3$] | | | 1.34 | 0.92 | 0.92 | 0.92 |
| Water (W) | | | 25% aqueous NaCl solution | pure water | pure water | pure water |
| Evaluation of characteristics | adhesiveness (under high humidity) | | A | A | D | — |
| | separability | peelability | A | D | A | — |
| | | sortability | A | — | A | — |
| | viscosity stability of barrier layer (A) after separation and collection | | B | D | C | — |

From the results shown in Table 1 and Table 2, it is proven that the multilayer structure of each Example was superior in the adhesiveness of the interlayer under high humidity, the separability in water, and the viscosity stability after separation and collection. On the other hand, the multilayer structure of Comparative Example 1 not having the water-soluble layer (B) was inferior in the separability in water and the viscosity stability after separation and collection. The multilayer structure of Comparative Example 2 in which the water-soluble layer (B) containing less alkali metal ion (b1) was formed was inferior in the adhesiveness of the interlayer under high humidity, also accompanied by lowered viscosity stability after the separation and collection. The multilayer structure of Comparative Example 3 in which the water-soluble layer (B) containing more alkali metal ion (b1) was formed exhibited severe gelation in film formation, whereby obtaining an appropriate multilayer structure failed. It is to be noted that in Example 16, the viscosity stability after collection is considered to be evaluated as "B" since the chloride ion in water (W) also transferred to the barrier layer (A).

INDUSTRIAL APPLICABILITY

The multilayer structure of the present invention can be suitably used as a food packaging material and an other packaging material. Furthermore, putting a multilayer structure into practice is enabled, which is superior also in viscosity stability when collecting and reutilizing a barrier layer after separation. Thus, the multilayer structure of the present invention can be suitably used in a recycling method having a collecting step in which each layer is separated through exposing to water, followed by reutilizing each of the layers.

The invention claimed is:

1. A multilayer structure comprising a barrier layer (A), a water-soluble layer (B), and an adhesive layer (C), wherein the adhesive layer (C) is laminated via the water-soluble layer (B) on one or both faces of the barrier layer (A), the barrier layer (A) comprises a polyamide or an ethylene-vinyl alcohol copolymer (a1) as a principal component, the water-soluble layer (B) comprises an alkali metal ion (b1) at a content of 10 ppm or more and 2,000 ppm or less, a solubility parameter of a resin constituting the principal component of the barrier layer (A) is 11.0 (cal/cm$^3$)$^{1/2}$ or more, and a ratio ($SP_A/SP_B$) of a solubility parameter ($SP_A$) of the barrier layer (A) to a solubility parameter ($SP_B$) of a resin constituting the principal component of the water-soluble layer (B) is 0.60 or more and 0.95 or less.

2. The multilayer structure according to claim 1, wherein the water-soluble layer (B) comprises a vinyl alcohol polymer (b2) as a principal component.

3. The multilayer structure according to claim 2, wherein a viscosity-average degree of polymerization of the vinyl alcohol polymer (b2) is 400 or more and 2,000 or less.

4. The multilayer structure according to claim 2, wherein a degree of saponification of the vinyl alcohol polymer (b2) is 70 mol % or more and 95 mol % or less.

5. The multilayer structure according to claim 2, wherein a total content of a vinyl alcohol unit and a vinyl ester unit in the vinyl alcohol polymer (b2) is 95 mol % or more.

6. The multilayer structure according to claim 1, wherein the alkali metal ion (b1) comprised in the water-soluble layer (B) is a sodium ion.

7. The multilayer structure according to claim 1, wherein the water-soluble layer (B) further comprises a plasticizer (b3), and a component constituting the plasticizer (b3) is at least one selected from the group consisting of glycerin, polyethylene glycol, polypropylene glycol, polyglycerin, mannitol, sorbitol, and pentaerythritol.

8. The multilayer structure according to claim 1, wherein the barrier layer (A) comprises the ethylene-vinyl alcohol copolymer as the principal component.

9. The multilayer structure according to claim 1, wherein the barrier layer (A) further comprises an alkali metal ion (a2) at a content of 50 ppm or more and 500 ppm or less.

10. The multilayer structure according to claim 1, wherein the barrier layer (A) further comprises an aliphatic acid having 12 or more carbon atoms or a salt thereof at a content of 1 ppm or more and 5,000 ppm or less.

11. The multilayer structure according to claim 1, wherein the barrier layer (A) further comprises a boron compound at a content of 1 ppm or more and 300 ppm or less.

12. The multilayer structure according to claim 1, wherein the adhesive layer (C) comprises a carboxylic acid-modified polyolefin as a principal component.

13. The multilayer structure according to claim 1, further comprising an other thermoplastic resin layer (D), wherein a density of the other thermoplastic resin layer (D) is 1.0 g/cm$^3$ or less.

14. The multilayer structure according to claim 1, wherein a density of the barrier layer (A) is 1.0 g/cm$^3$ or more, and a density of an entirety of layers, other than the barrier layer (A) and the water-soluble layer (B), is 1.0 g/cm$^3$ or less.

15. A separation method comprising:

bringing the multilayer structure according to claim 1 into contact with water (W) having a temperature of 20° C. to 95° C. to dissolve a part or all of the water-soluble layer (B); and sedimenting a substance (X) comprising the barrier layer (A) and floating a substance (Y) comprising the adhesive layer (C) in the water (W).

16. A method for recycling a multilayer structure, the method comprising:

independently melt molding each of the substance (X) and the substance (Y), being collected in the separation method according to claim 15.

17. The multilayer structure according to claim 1, wherein the water-soluble layer (B) comprises a vinyl alcohol polymer (b2) as a principal component, and wherein, in the vinyl alcohol polymer (b2), a total content of a monomer unit other than a vinyl alcohol unit and a vinyl ester unit is less than 1 mol %.

18. The multilayer structure according to claim 1, wherein the water-soluble layer (B) comprises a vinyl alcohol polymer (b2) as a principal component, and wherein the vinyl alcohol polymer (b2) comprises an ethylene-modified polyvinyl alcohol having an ethylene unit content of 10 mol % or less.

* * * * *